(12) United States Patent
Galloway et al.

(10) Patent No.: US 6,476,859 B1
(45) Date of Patent: Nov. 5, 2002

(54) THERMAL TRACKER

(75) Inventors: John Lindsay Galloway; Bryan Lorrain Humphreys Wilson; Stephen George Porter, all of Towcester (GB)

(73) Assignee: Infrared Integrated Systems Limited, Northants (GB)

( * ) Notice: Subject to any disclaimer, the term of this patent is extended or adjusted under 35 U.S.C. 154(b) by 0 days.

(21) Appl. No.: 09/579,636

(22) Filed: May 26, 2000

(30) Foreign Application Priority Data

May 27, 1999 (GB) .............................................. 9912433

(51) Int. Cl.⁷ ................................................. H04N 7/18
(52) U.S. Cl. ........................ 348/164; 348/143; 348/152; 348/155; 348/169; 348/211
(58) Field of Search ................................. 348/164, 169, 348/211, 143, 152, 153, 154, 155; H04N 7/18

(56) References Cited

U.S. PATENT DOCUMENTS

| | | | | |
|---|---|---|---|---|
| 5,473,368 A | * | 12/1995 | Hart | 348/169 |
| 5,936,666 A | * | 8/1999 | Davis | 348/143 |
| 6,396,534 B1 | * | 5/2002 | Mahler et al. | 348/155 |

* cited by examiner

Primary Examiner—Howard Britton
(74) Attorney, Agent, or Firm—Moser, Patterson & Sheridan, L.L.P.

(57) ABSTRACT

An image of a scene is focused onto a two dimensional array of passive infrared sensing elements mounted on and connected to an integrated circuit, and used to detect the location of events within the scene; for example, movement, change in temperature, or the emission of a gas. In this invention knowledge of the location of the event is derived from the detection of signals from one or more elements of the array, and is used to control the operation of a mechanism such that a portion of the scene including the event location is imaged onto a video imaging device operating in the visible or near infrared. Such mechanisms include a zoom lens or mirror arrangement and mechanical scanning in elevation and/or azimuth. Examples of suitable imaging devices for use with the thermal detector array include CCD camera chips and other electrically scanned silicon photovoltaic arrays. The CCD array might for example be used in a CCD camera, which is used to identify an intruder, or to read the number plate of a car. The event located within the scene may in addition be illuminated with a visible or infrared beam or a searchlight switched on and/or directed by the identification of an event by the thermal array.

21 Claims, 3 Drawing Sheets

THERMAL TRACKER

BACKGROUND

Figure 1:
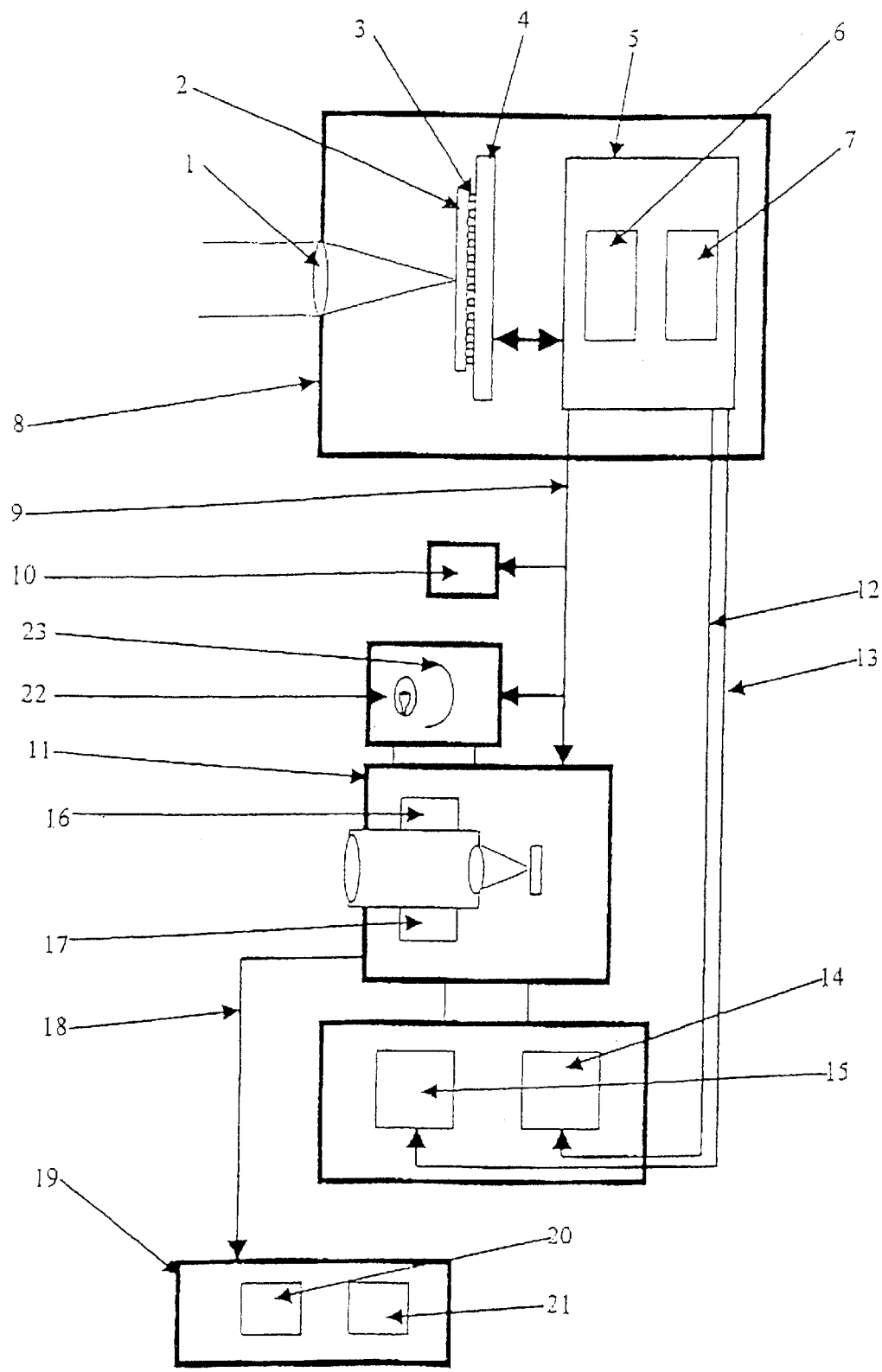

Passive infra-red (PIR) devices using the pyroelectric effect and operating in the wavelength region 2 $\mu$m to 14 $\mu$m are widely used to automatically detect events, such as fires and intruders, where their sensitivity to changes in temperature provides discrimination not available to visible detectors. Examples of this are disclosed in European Patent Application EP 0853237 A1. The sensitivity of a PIR device to changes in temperature rather than absolute temperature makes it especially suitable for detecting movement or the onset of a fire. Arrays of passive infra-red detectors in an imaging system can provide spatial information about the location of events within their field, but their use to recognise events in detail, such as the appearance of an intruder, is limited because passive infra-red imagers of good resolution are very expensive. In the case of pyroelectric detector arrays arrangements must be made to chop or modulate the radiation incident on the detectors to provide a convnetional image of the scene. However if the infra-red radiation is not chopped only changes in temperature or movement are detected, so that the output from the array, which is not a recognisable image in the normal sense, contains only information about any portions of the scene which are changing.

Video cameras are widely used for surveillance, but suffer from the disadvantage that the identification of significant events may require the intervention of a human operator. Also, when the camera covers a wide field, the resolution of the camera may be insufficient to provide for recognition of an intruder or a car number plate. Such cameras require the scene to be continuously illuminated, either by daylight or by artificial light. In contrast, a pyroelectric detector array can be used to identify events with minimal signal processing because it generates a signal only when the temperature changes at some point within the scene, and will do this equally well in daylight or in total darkness.

SUMMARY OF THE PRESENT INVENTION

The present invention provides a passive infrared sensor system comprising: a passive infrared detector comprising a two dimensional array of passive infrared sensing elements and means for focusing infrared radiation from a sense onto the array, such that any event within the scene which results in a change in apparent temperature produces a signal in the element or elements corresponding to the region of the scene in which the event occurs; electronic readout, control, and signal processing circuits connected to the array arranged to identify any elements that produce signals corresponding to an event within the scene and to generate output signals which indicate the occurrence of an event and its location within the scene; and a video camera operating in the visible or near infrared spectral region combined with a directive mechanism operable in response to signals from said readout, control and signal processing circuits to steer the camera in azimuth and elevation towards the location of the event. Thus, in its preferred embodiment the present invention allows the automatic detection capability of passive infrared devices to be combined with a visible camera of high resolution directed to the area or areas of interest.

In the preferred embodiment of the present invention, the image of a scene in which it is required to detect events is focused by a lens or mirror on to a two dimensional array of infra-red devices operating in the whole or a part of the wavelength range 2 $\mu$m to 15 $\mu$m. The array is formed of pyroelectric sensing elements which detect the changes of temperature due to an event rather than the actual temperature of the elements of the scene. Suitable detector arrays will usually be rectangular and contain between eight and a hundred elements in each dimension, corresponding in a square detector array to between sixty-four and ten thousand elements. The occurrence of a possibly significant event is indicated by a signal from an element of the array. The significance of the event may be further verified by other procedures such as those that are described in UK Patent Application 2340222A.

When an event has been judged to be significant an electronic video camera, operating in the visible or near infra-red, is steered in azimuth and elevation so that its field of view is centred on that portion of the scene which corresponds to the element or elements of the pyroelectric array with an above threshold signal. If a number of significant events are identified by the infrared array the camera may be steered to each event in turn. Alternatively, one of the events may be selected according to pre-determined parameters such as the amplitude of the signals, the apparent size of the event, the order of occurrence of the events, or the relative movements of the events. The camera is standby mode may be focused on the whole scene under surveillance and a zoom lens arrangement may be employed to give better resolution of the element of the scene where the significant event has been identified. The action of the zoom facility may be controlled by a signal generated from the pyroelectric detector indicative of the apparent size of the event within the scene. The camera may also be focused automatically on to the portion of the scene that has been selected. Focusing may be achieved either by a self contained automatic focusing system within the video camera, or by an automatic focusing system which is controlled by a signal generated from the pyroelectric array indicative of the distance of the event from the sensor system.

If the illumination of the scene is inadequate for the video camera, additional illumination may be employed to aid its operation, either globally or directed at the region of scene judged to be significant. The steering mechanism for directed illumination is desirably the same mechanism as is used for the video camera. Where covert operation of the equipment is required the additional illumination may operate in the near infra red, around 0.8 $\mu$m wavelength, so that it is not detected by an intruder. Suitable sources of infrared illumination include tungsten filament lamps with appropriate band pass-filters and high power infrared emitting diodes, including diode lasers. The light source may be combined with suitable lenses and/or mirrors to form an infrared or visible searchlight illuminating the desired area.

The electronic video camera may be a CCD camera, or any other electronically scanned array of silicon photodiodes. It may be equipped with storage means, such as a magnetic type, or a silicon DRAM preceded by analogue to digital conversion. Each frame is scanned at a conventional video rate and the frame rate may be a conventional video frame rate, or a lower rate such as 1–5 frames per second to economise on storage. Means may also be provided for recording the event location and/or size. This could, for example be added to the magnetic tape video recording in such a way as to indicate the position and/or size of each recorded event within the scene when the video tape is re-played.

When a signal above a pre-set threshold is generated from one or more elements of the array, the video camera is steered so that its image is centred on the relevant region of the scene. If the camera in standby mode surveys the whole scene that is imaged by the pyroelectric array, a zoom lens arrangement increases the focal length of the camera so that it images only a portion of the scene in the appropriate region. This may be followed by auto focus adjustment. If several separate elements of the array are above threshold the video camera may be steered to each relevant portion of the scene in turn, or it may be directed to one of the events, for example the one giving the largest signal, or the first one to appear. Arrangements may be made to decrease the occurrence of false alarms in the equipment, for example those described in UK patent application number 2340222A, before the video camera is moved.

When the equipment is used to identify intruders, the arrangement ensures the high quality visual images of the intruders and/or their vehicle are made available to operators monitoring the equipment remotely when an alarm signal is generated. Alternatively, these images may be stored, either within the video camera itself or remotely, for subsequent examination. When used to identify a fire, the progress of the fire may be monitored and the appearance of people near the fire may be recorded e.g. arsonists or fire fighters. On the other hand if operators are available the equipment can be used to prevent the alerting of external services when the high quality directed images from the video camera reveal (for example) that the alarm has been triggered by sunlight, automatic central heating equipment, animals or wind blown objects, or by persons with legitimate access to the area. When used to detect the emission of a gas, the discrimination of the pyroelectric array may be enhanced by means of band pass filters to confine it sensitivity to the absorption bands of the gas.

In addition to the video camera, it may be desirable to direct auxiliary equipment towards the location of the event within the scene. One example of auxiliary equipment is a source of illumination, as described above; another example is a water jet, which may be directed at the seat of a fire. Alternatively, the system may include means for displaying or recording the spatial co-ordinates and/or the apparent size of the event, as derived from the signals generated by the pyroelectric sensor system.

In the foregoing, it is assumed that the passive infrared detector is stationary with respect to the scene. However, in another preferred embodiment, the detector itself is movable as well as the video camera. The detector may be steered by the same directive mechanism as the video camera, for example by being mounted with the video camera on a pan and tilt mechanism so that the optical axes of the detector and the camera are coincident. Alternatively, the array may have an independent mechanism. Thus, when an event has been judged to be significant, the array and the camera are steered in azimuth and elevation so that their fields of view are both centred on that portion of the scene in which the event is occurring.

GENERAL DESCRIPTION

The description, which follows, is for illumination only and does not restrict the scope of the claims.

Figure 2:
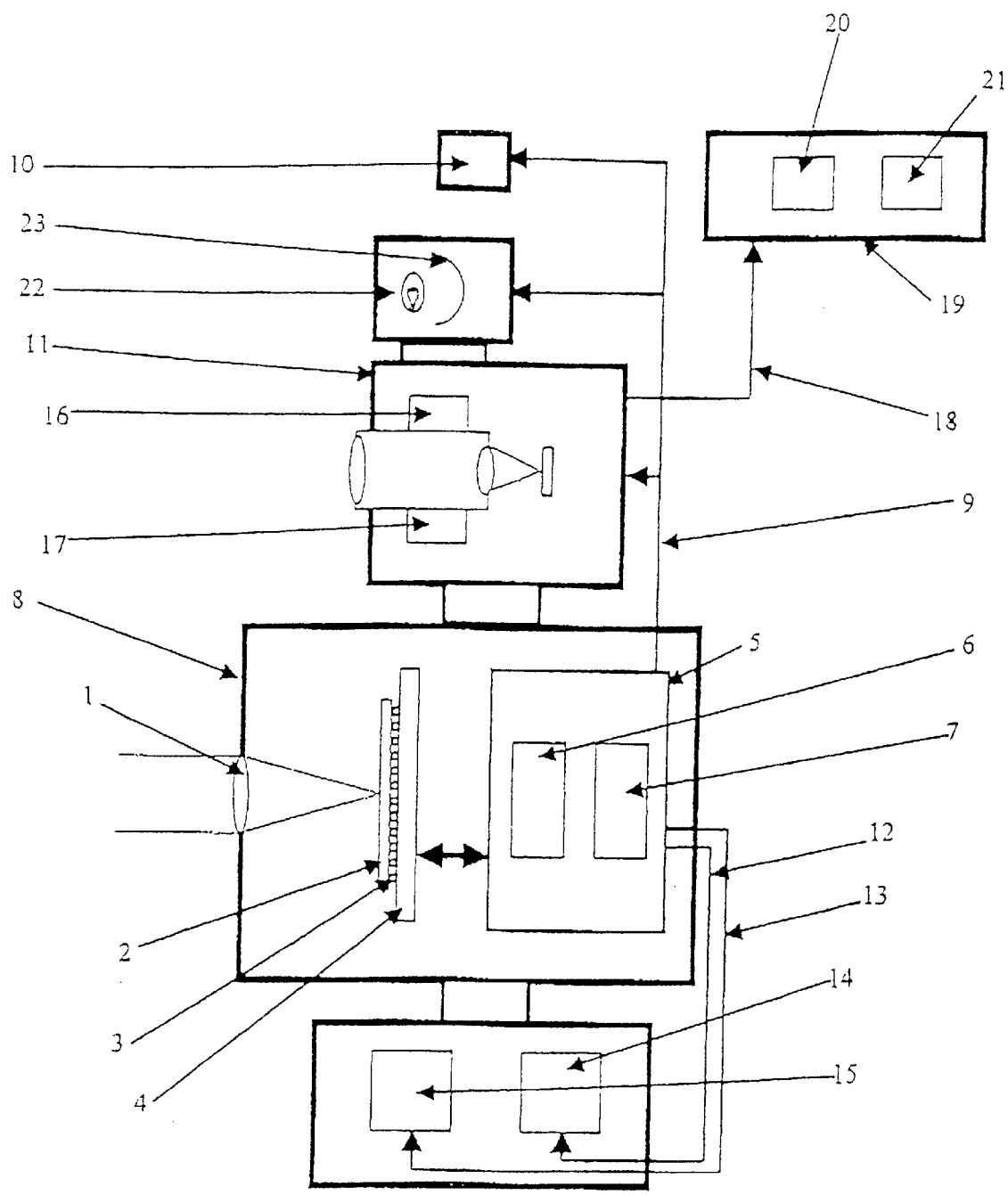
Figure 3:
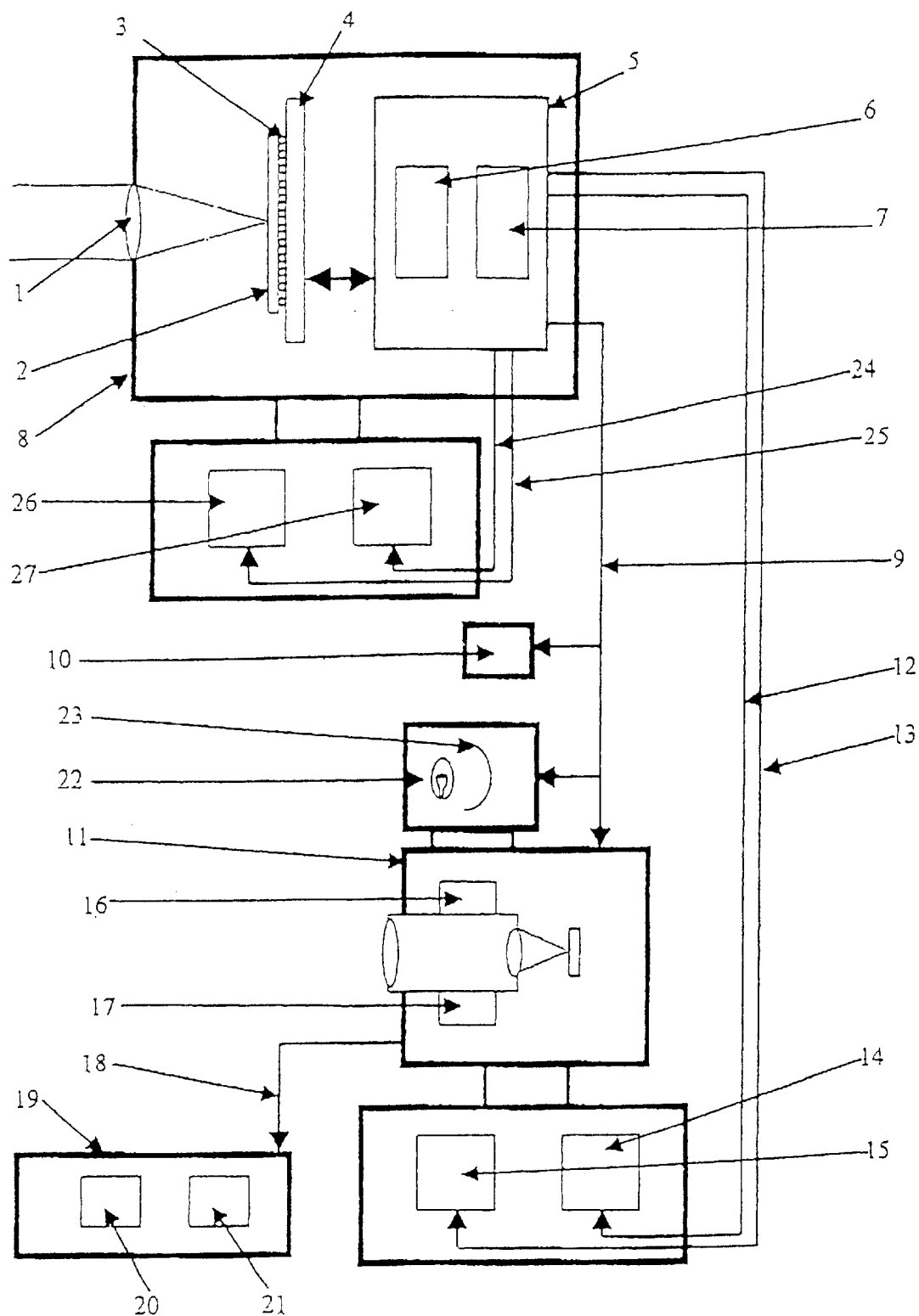

FIG. 1. is a schematic block diagram illustrating a first example of a sensor system according to the invention, FIG. 2 is a schematic block diagram illustrating a second example of a sensor system according to the invention; and FIG. 3 is a schematic block diagram illustrating a third example of a sensor system according to the invention. invention.

Referring to FIG. 1, thermal radiation from a scope under surveillance is focused by an infrared lens 1 on to a pyroelectric detector array 2 which is mounted by means of conducting resin pillars 3 on an integrated circuit 4 to which each element of the array is connected. A sensor embodying such an array is described in EP 0853237A1.

The operation of the system is controlled by the control unit 5 consisting of one or more microprocessors 6 and 7 mounted on a printed circuit or ceramic circuit board and connected to the integrated circuit 4. These components are mounted within a housing, opaque apart from the lens 1, and the whole forms the pyroelectric thermal sensor 8. The microprocessors control the timing and operation of the system. The integrated circuit 4 amplifies the signals from the detector array and, together with the microprocessors, performs signal-processing operations on them, including the identification of elements from which the signals are above a pre-set threshold. Such signals indicate that an event of relevance has occurred and where in the scene it is located, but may be subject to further checks, including those described in UK Patent 2339277B to eliminate false alarms.

When an event corresponding to an alarm condition is indicated (e.g. the entry of an intruder into the scene), signals from the control unit are carried by lead 9 to a remote alarm indicator 10 and to a video camera 11. Two other leads 12 and 13 carry information about the horizontal and vertical position of the detector element or elements where the event is identified. These are led to motors 14 and 15, e.g. stepper motors, which control the azimuthal angle and angle of elevation of the video camera. If events are identified in more than one region, information about the location of these other regions is carried to the stepper motors in turn, typically at intervals of a few seconds. In standby mode the video camera surveys the whole scene covered by the pyroelectric sensor 8. When an alarm signal is generated, a zoom lens in the video camera under the control of a controller 16 narrows the field of view of an appropriate region of the scene. If required an auto focus controller 17 may also be activated. The alarm signal also activates the storage of the video information from the camera. The video signal is led by lead 18 to a remote monitor 19 incorporating a visible display 20 and appropriate video recording means 21. Alternatively these units may be included in the video camera 11. The scan rate of the video camera is conventional, but to economise on storage frames may be stored at intervals of one to five seconds.

The alarm lead 9 may actuate a light source 22 with a mirror and/or lens arrangement 23 to focus the light on to the element of the scene where the alarm has been detected. The light source may be mounted independently or on the video camera. A tungsten filament or other conventional light source can be used. If covert operation is desired, visible light from the source may be obscured by an optical filter which transmits in the near infrared from 0.75 $\mu$m to 1.0 $\mu$m. Alternatively an infrared light emitting diode operating in this region, possibly a diode laser, may be used without the filter. Where economy of power is needed the laser may be pulsed at a rate corresponding to the rate of storage of video frames.

In operation the system provides an alarm from movement or temperature rise within the scene under surveillance, with or without the intervention of a subsidiary checking monitor (not shown) to discriminate between different types of event or to verify that an alarm condition actually exists. An event which causes an above threshold signal from one or more elements of the pyroelectric detector array is judged as an alarm condition. Signals are generated which direct the video camera to the location of the event or if more than one location is involved to each location in turn by means of the stepping motors. As the video camera will normally be covering the whole scene in standby mode, simultaneously a zoom mechanism limits the field of view of the video camera to the area(s) where the events have been generated and if required an auto focus mechanism is actuated. The video camera gives images of the locations where events are occurring and stores those images at the location of the camera and remotely. Those images may be examined at the time by an operator, to verify the nature of intruders, distinguish them from those with legitimate business in the area or from non-threatening events or to check the progress of a fire, and to decide whether to call for assistance. The stored images may be examined subsequent to the event to identify intruders or their vehicle or to help find the cause of a fire. If required a directed light source may be mounted with the camera to illuminate the area where the event has been recognised, and if required that light source may operate covertly in the near infrared.

Thus compared with surveillance by a normal CCTV camera unaided by a pyroelectric array, the system gives automatic recognition of a significant event or events and a narrow field of view video camera image of the location(s) where the event(s) has been recognised. A video recording of the event(s) may be enhanced by a record of the location (s) where the event(s) has been recognised.

Referring to FIG. 2, except as described below, the operation of the system is the same as in the first example, as are the descriptions and numbers of the components of the block diagram. The main difference between this example and the first example is that the pyroelectric thermal sensor 8 is located on the same moveable platform as the camera, so that the motors 14 and 15 move both the thermal sensor and the camera 11 together. The optical axes of the thermal sensor and the camera are aligned with each other.

As before, the control unit 5 controls the operation of the system, but in this example the processing is organised so that the activity caused by an event corresponding to an alarm condition is brought to the centre of the array through the operation of the motors 14 and 15. As the camera and thermal sensor have their optical axes aligned, the event will again be in the centre of the field of view of the camera and the zoom and focusing operations can take place as previously described.

During movement of the array, any static objects in the field of view of the array that exhibit sufficient temperature contrast with the background may generate above threshold signals in the array. To avoid spurious operation, means can be used to eliminate these unwanted signals. Two examples of such means are:

The signals from the array are ignored during the period of movement from the initial location to that computed to bring the event to the centre of the array's field of view. This results in a step-wise approximation to the location of moving events.

Using the knowledge that the angular movement across the array of events caused by static objects is the exact opposite of the angular movement being implemented by the control circuits the unwanted signals can be identified and eliminated. All events that exhibit the opposite angular movement characteristics from the array are caused by the array scanning over static objects and can be ignored.

The advantages of this embodiment over the first embodiment are that:

only one array is required to cover a 360° field of the view, whereas a number of arrays are required to cover an arc of 360° in the first embodiment, the alignment of the optical axes on one platform eliminates optical "calibration" on a site by site basis.

Referring to FIG. 3, except as described below, the operations of the system is the same as in the first example, as are the descriptions and numbers of the components of the block diagram. The main difference between this example and the first example is that the pyroelectric thermal sensor 8 is located on a separate platform moved by motors 26 and 27, in response to signals on leads 24 and 25 carrying information about the horizontal and vertical position of the detector element or elements where the event is identified.

As before, the control unit 5 controls the operation of the system, but in this example the processing is organised so that the activity caused by an event corresponding to an alarm condition is used to independently bring the event to the centre of the fields of view of both the thermal sensor and the camera, as described in the previous two examples. The event is brought to the centre of the array through the operation of the motors 26 and 27, and at the same time to the centre of the field of view of the camera through the operation of the motors 14 and 15.

Detection of static objects during movement of the array can be eliminated as previously described.

The advantage of this embodiment over the first embodiment is that separate mounting locations can be used, but more flexibility is available in mounting options and the shape of the area to be covered, than is permitted by the first embodiment.

In both example one and example three, the relationship between the optical axes of the camera and thermal sensor has to be established so that the mapping between a location on the thermal sensor array and a location in the camera's field of view can be identified. The mapping can be established by simultaneously aligning the optical axes of both devices onto a number of locations in their joint field of view.

What is claimed is:

1. A passive infrared sensor system comprising:

a passive infrared detector comprising a two dimensional array of passive infrared sensing elements and means for focusing infrared radiation from a scene onto the array, such that any event within the scene which results in a change in apparent temperature produces a signal in the element or elements corresponding to the region of the scene in which the event occurs;

electronic readout, control, and signal processing circuits connected to the array arranged to identify any elements that produce signals corresponding to an event within the scene and to generate output signals which indicate the occurrence of an event and its location within the scene; and a video camera opening in the visible or near infrared spectral region combined with a directive mechanism operable in response to signals from said readout, control and signal processing circuits to steer the camera in azimuth and elevation towards the location of the event.

2. A passive infrared sensor as claimed in claim 1 further comprising a directive mechanism operable in response to signals from said readout, control and signal processing circuits to steer the passive infrared detector in azimuth and elevation so as to bring the event to the centre of the field of view of the passive infrared detector.

3. A passive infrared sensor system as claimed in claim 1 in which the passive infrared detector is arranged to be steered by the same directive mechanism operable to steer the camera.

4. A passive infrared sensor as claimed in claim 3 in which the passive infrared detector is positioned such that the optical axes of the passive infrared detector and the camera are coincident.

5. A system as claimed in claim 1 in which the array of passive infrared sensing elements is mounted directly onto an integrated circuit.

6. A system as claimed in claim 5 in which the integrated circuit incorporates all or part of the electronic readout, control, and signal processing circuits.

7. A system as claimed in claim 1 in which output signals are generated only when one or more of the sensing element signals exceed a pre-set threshold.

8. A system as claimed in claim 1 in which, if events are identified in more than one location, the video camera is directed towards each location in turn.

9. A system as claimed in claim 1 in which, if events are identified in more than one location, the video camera is directed towards the location of one of the events which is selected according to pre-determined parameters.

10. A system as claimed in claim 1 in which the readout, control, and signal processing circuits generate an output signal indicating the apparent size of the event.

11. A system as claimed in claim 10 in which the video camera incorporates a zoom lens whose effective focal length is controlled according to the apparent size of the event.

12. A system as claimed in claim 1 in which the video camera incorporates an automatic focusing mechanism.

13. A system as claimed in claim 1 in which the readout, control, and signal processing circuits generate an output signal indicating the distance of the event from the sensor system.

14. A system as claimed in claim 12 in which the focusing mechanism is controlled by the signal indicating the distance of the event from the sensor system.

15. A system as claimed in claim 1 in which an auxiliary system is directed towards the location of the identified event or events.

16. A system as claimed in claim 15 in which the auxiliary system includes a source of illumination.

17. A system as claimed in claim 15 in which the auxiliary system includes a jet of water.

18. A system as claimed in claim 1, which includes means for displaying the spatial co-ordinates and/or the size of the event or events within the scene.

19. A system as claimed in claim 1 which includes means for recording the spatial co-ordinates and/or the size of the event or events within the scene.

20. A system as claimed in claim 19 in which the recorded data is linked to a video record of the event or events.

21. A system as claimed in claim 1 in which an alarm condition is generated when the event is identified.

* * * * *

UNITED STATES PATENT AND TRADEMARK OFFICE
CERTIFICATE OF CORRECTION

PATENT NO.   : 6,476,859 B1  Page 1 of 1
DATED        : November 5, 2002
INVENTOR(S)  : John Lindsay Galloway et al.

It is certified that error appears in the above-identified patent and that said Letters Patent is hereby corrected as shown below:

Column 6,
Line 52, please change "opening" to -- operating --.

Signed and Sealed this

Twenty-fifth Day of February, 2003

JAMES E. ROGAN
*Director of the United States Patent and Trademark Office*